United States Patent
Nakamura et al.

(10) Patent No.: US 6,837,077 B2
(45) Date of Patent: Jan. 4, 2005

(54) METHOD FOR PRODUCING SOOT BODY

(75) Inventors: Motonori Nakamura, Kanagawa (JP); Toshihiro Ooishi, Kanagawa (JP); Yuichi Ohga, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 171 days.

(21) Appl. No.: 10/247,514

(22) Filed: Sep. 20, 2002

(65) Prior Publication Data

US 2003/0070450 A1 Apr. 17, 2003

(30) Foreign Application Priority Data

Sep. 20, 2001 (JP) .................................... P. 2001-286326

(51) Int. Cl.$^7$ ............................................. C03B 37/018
(52) U.S. Cl. ........................................ 65/421; 65/382
(58) Field of Search .......................... 65/377, 382, 421, 65/531, 533, 534

(56) References Cited

U.S. PATENT DOCUMENTS

| | | | | |
|---|---|---|---|---|
| 6,047,564 A | * | 4/2000 | Schaper et al. | |
| 6,324,871 B1 | * | 12/2001 | Nakamura et al. | 65/421 |
| 2003/0101770 A1 | * | 6/2003 | Nakamura et al. | 65/382 |

FOREIGN PATENT DOCUMENTS

| | | | | |
|---|---|---|---|---|
| EP | 1 044 931 A | * | 10/2000 | |
| EP | 1 065 175 A1 | * | 1/2001 | |
| JP | 63310745 | * | 12/1988 | |
| JP | 1009821 | * | 1/1989 | |
| JP | 03-109231 | * | 5/1991 | ......... C03B/37/018 |
| JP | 3-126633 | | 5/1991 | |
| JP | 3-228845 | * | 10/1991 | |
| JP | 3279234 | * | 12/1991 | |
| JP | 7-126031 | | 5/1995 | |
| JP | 2612949 | | 2/1997 | |
| JP | 10-158025 | * | 6/1998 | ......... C03B/37/018 |
| JP | 2000-44276 A | * | 2/2000 | |

* cited by examiner

Primary Examiner—Steven P. Griffin
Assistant Examiner—Carlos Lopez
(74) Attorney, Agent, or Firm—McDermott Will & Emery LLP

(57) ABSTRACT

Three or more glass particle synthesizing burners are arranged to be opposed to a rotating glass rod. The glass rod and the glass particle synthesizing burners are reciprocated in parallel and relatively to deposit glass particles synthesized by the burners on the surface of the glass rod, thereby producing a soot body. The glass particle synthesizing conditions of the burners arranged at both ends are changed to have a greater deposition amount of glass particles per unit time in part or all of its movement range than other burners.

7 Claims, 7 Drawing Sheets

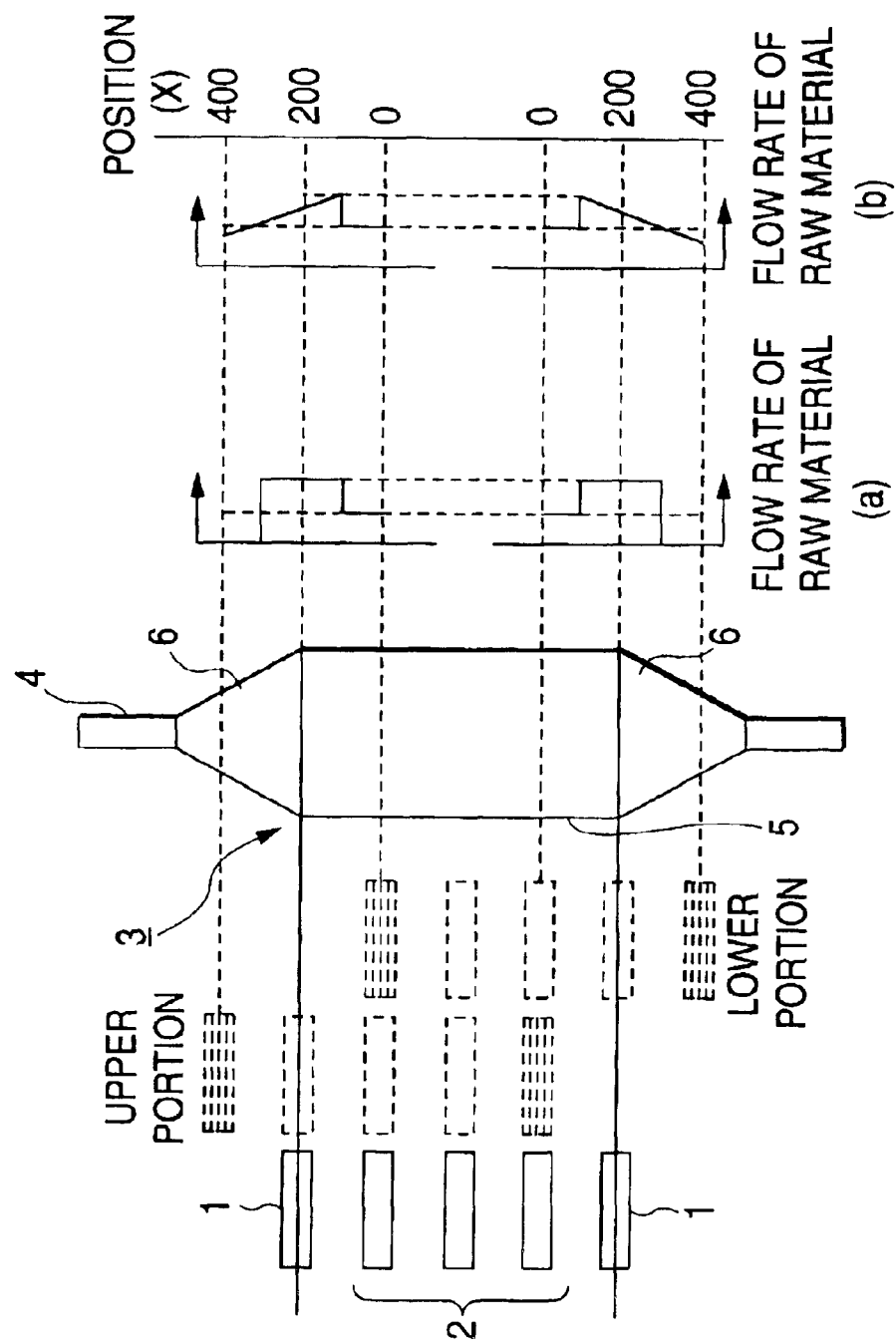

METHOD FOR PRODUCING SOOT BODY

BACKGROUND OF THE INVENTION

1. Field of the Invention

The present invention relates to a method for producing a soot body by depositing glass particles on a glass rod while reciprocating the glass rod and glass particle synthesizing burners relatively. More particularly, the present invention relates to a method for producing a soot body which has a long effective portion and short taper portions (ineffective portions) formed at both ends.

2. Description of the Related Art

There is a method for producing a large soot body at high deposition rate in which a plurality of glass particle synthesizing burners are arranged at regular intervals to be opposed to a glass rod within a reaction vessel, and glass particles synthesized by the burners are deposited in layers on the surface of the glass rod by reciprocating relatively a burner array and the glass rod while rotating the glass rod.

In this method for producing the soot body, the main subjects involve reducing the variation in an outer diameter in a longitudinal direction of the soot body from a viewpoint of improvement of quality, and making a length of taper portions (ineffective portion) formed at both ends of soot body as short as possible from a viewpoint of productivity. Various methods have been offered.

For example, there is a method in which a turn-back position of reciprocating movement between the glass rod and the burners is shifted in a predetermined direction at every turn-back, and shifted in a reverse direction if the turn-back position reaches a predetermined position to be back to an initial position of the reciprocating movement (Japanese Patent No. 2612949). At the turn-back position, the deposition time of glass particles is substantially lengthened, and a degree of touching of burner flame against the soot body is changed, thereby resulting in the variation of the outer diameter in the turn-back position. By dispersing the turn-back position over the entire soot body as mentioned above, it is possible to equalize the deposition amount of glass particles in the longitudinal direction and reduce the variation in the outer diameter.

In this method, since the turn-back position is shifted, an area where glass particles synthesized by the burners arranged at both ends of the burner array are deposited is lengthened, so that the ineffective portion is longer than when the turn-back position is not shifted. Simultaneously, the portion that ought to have been an effective portion becomes the ineffective portion, resulting in a problem that the length of the effective portion is shorter, and the yield is decreased.

The soot body is vitrified, finished through a flame polishing process, and drawn to have an optical fiber. To remove a portion of larger outer diameter in the ineffective portion of soot body, it is required that the glass of larger outer diameter portion is melted after vitrification, and torn off, thereby taking more processes and higher costs.

Alternatively, the optical fiber obtained from the ineffective portion is discarded after the optical fiber is formed from the soot body in a drawing process. However, if the ineffective portion is long, it takes a lot of time to start drawing the effective portion in the drawing process, thereby taking higher costs.

SUMMARY OF THE INVENTION

A method for producing a soot body according to the present invention comprises: reciprocating a glass rod and at least three glass particle synthesizing burners which are arranged to be opposed to the glass rod, in parallel and relatively by a distance of burner-to-burner interval while performing an operation that a turn-back position of the reciprocating movement is shifted by a predetermined width in a predetermined direction at every turn-back, and if the turn-back position is moved substantially by a distance of the burner-to-burner interval, the turn-back position is shifted in a reverse direction to be back to an initial position of the reciprocating movement, so as to deposit glass particles synthesized by the burners on a surface of the glass rod while rotating the glass rod, wherein glass particle synthesizing conditions of the burners arranged at both ends of the burners are changed to have a greater deposition amount of glass particles per unit time than other burners in at least a part of a movement range of the end burners.

BRIEF DESCRIPTION OF THE DRAWINGS

FIG. 2 is an explanatory view showing a preferred example of a pattern for changing a supply amount of raw material to end burners in this invention;

DETAILED DESCRIPTION OF THE INVENTION

Figure 1:
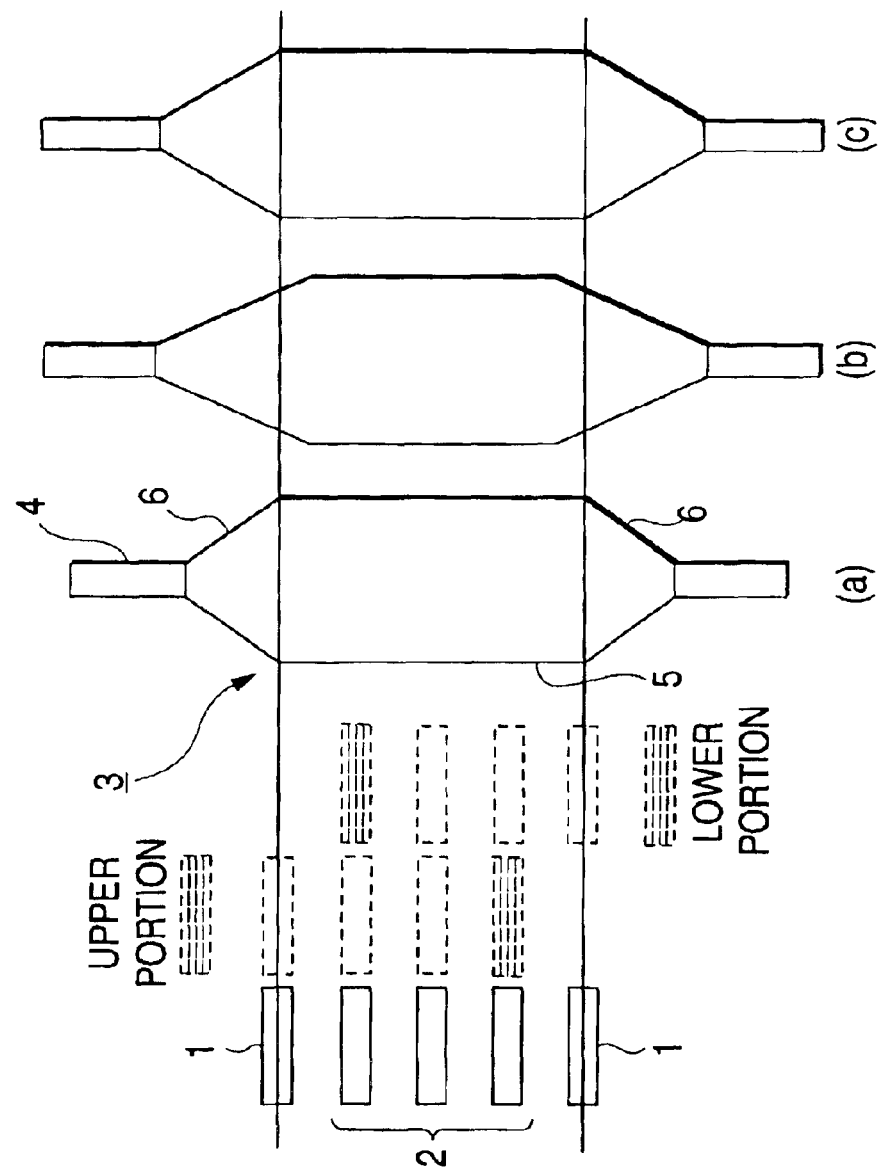
FIG. 1 is an explanatory view typically showing how an effective portion and an ineffective portion are formed in one example of soot body according to an embodiment of the present invention.

The preferred embodiments of the present invention will be described below in detail with reference to the accompanying drawings. FIG. 1 is an explanatory view typically showing how an effective portion (outer diameter steady portion) 5 and an ineffective portion (outer diameter unsteady portion) 6 are formed in a case where a soot body 3 is produced by reciprocating relatively burners 1, 2 and a glass rod 4 by a distance of burner-to-burner interval. The embodiment of the present invention as shown in FIG. 1 employs five glass particle synthesizing burners (two end burners and three intermediate burners) arranged at regular intervals to form a burner array. For the simpler explanation, the movement of the turn-back position of the reciprocating movement in FIG. 1 is not shown in the figure.

In the case where glass particles synthesized by the end burners 1 arranged at both ends of the burner array are deposited by a predetermined amount, the effective portion 5 of the soot body should be in a range between central positions of the end burners 1 (hereinafter the range is referred as burner set-up range), as shown in FIG. 1(*a*). Also, since the reciprocating movement occurs over upper and lower portions from the central positions of the end burners 1, the ineffective portion 6 corresponds to the movement amount of burners outside the burner set-up range. However, in practice, since glass particles synthesized by the burners tend to flow in the direction where a deposited glass particles layer is thinner, the deposition range of glass particles is spread outside. As a result, an area that ought to have been the effective portion 5 becomes the ineffective portion, as shown in Fig. 1(*b*).

The present inventors made various acute investigations to solve this problem, and found that when the glass particle synthesizing conditions of the burners at both ends (end burners 1) are changed in part or all of the movement range into the conditions where the deposition amount of glass particles per unit time is greater than other burners (intermediate burners 2), portions having a small outer diameter at both ends of soot body are thickened, and the length of the ineffective portion can be reduced without decreasing the length of the effective portion. In this invention, it is supposed that the effective portion has a tolerance of ±5% with respect to the target outer diameter of the soot body. Within this range, there is no problem with the characteristics of the optical fiber formed from this soot body.

A way of how to change the glass particle synthesizing conditions of the end burners 1 typically involves changing the supply amount of at least one of a raw material, a combustible gas and a gas which supports combustion (hereinafter this gas is referred as combustion support gas), and particularly changing the supply amount of raw material most effectively. When increasing or decreasing the supply amount of raw material to the end burners 1, it is preferable to change the conditions such that the flow rate of combustible gas and that of combustion support gas are changed in accordance with the flow rate of raw material to make the temperature of face of soot body on which glass particles are deposited by the end burners almost equal to the temperature of face of the soot body on which glass particles are deposited by the other burners.

To increase the glass particle deposition amount per unit time, the supply amount of raw material is increased (flow rate of raw material is increased). It was found that if the rate of increasing the supply amount of raw material to the end burners is 15% or less of the supply amount of raw material to the intermediate burners 2, the rate of increasing a diameter of a portion within the effective portion due to an increase in the supply amount of raw material can be suppressed within a tolerance (within +5% in outer diameter variation).

A variety of patterns for changing the supply amount of raw material can be considered, but in at least a part within the movement range of the end burners, the flow rate of raw material of the end burners is more than that of the intermediate burners 2. In the range outside the area with the initial flow rate of raw material, the flow rate is increased. It is desirable that the increased flow rate is given in the predetermined range, and the supply of raw material is stopped or reduced outside the predetermined range. The reason why the flow rate of raw material is decreased at the outermost position is to eliminate the waste of raw material by not depositing glass particles on unnecessary portion. It is preferable that the flow rate of raw material may be decreased stepwise or gradually, and finally, smaller than the flow rate for the intermediate burners 2 (including stop).

Also, positions of the glass rod 4 to which the end burners 1 are opposed are detected by CCD camera etc., and the supply pattern of raw material to the end burners 1 is changed based on the positional information, namely, the supply pattern of raw material is changed in accordance with the variation in the outer diameter of the soot body 3 on which glass particles are being deposited. Therefore, the deposition amount in the thickened portion or outer wasteful portion is decreased, and the deposition amount in the necessary portion is increased, whereby the outer diameter in the portion that ought to be the effective portion can be retained thick effectively.

A preferable example of pattern for changing the supply amount of raw material to the end burners is shown in FIGS. 2(*a*) and 2(*b*). FIG. 2(*a*) is a pattern in which the supply amount of raw material is increased in an appropriate range containing the center of the movement range of the end burners 1, and the supply of raw material is stopped outside of the appropriate portion towards the end portion of the soot body 3. FIG. 2(*b*) is a pattern in which the supply amount of raw material is increased at an appropriate position on the central side of the soot body 3 off the center of the movement range of the end burners 1, and the supply of raw material is gradually decreased on the end portion of the soot body 3. On the right side of FIGS. 2(*a*) and 2(*b*), the positions of the upper and lower end burners 1 are indicated in coordinates in the case where the burner-to-burner interval is 200 mm (x=200 is at the center of the movement range of the end burners 1).

Under these conditions, the effective portion length of the end portion can be lengthened, the raw material is not supplied to the wasteful portion or the supply amount of raw material to the wasteful portion is reduced, whereby the yield for the used amount of raw material is preferably increased. The favorable range where the raw material is increased is within 15% of the initial flow amount. Furthermore, it is preferable that the supply amount of raw material to the end burners is smaller than that to the other burners and the flow rate of combustible gas and the flow rate of combustion support gas are unchanged at the end portions. At this time, the temperature of flame generated by the burners is increased, resulting in greater bulk density at the end portions of the soot body, thereby preventing the glass particles deposit from cracking.

EXAMPLES

Example 1

A test for producing the soot body 3 was conducted, employing five glass particle synthesizing burners, as shown in FIG. 1, with a burner-to-burner interval of 200 mm being set. The relative movement between the burners and the glass rod 4 was made by reciprocating the glass rod 4 up and down. The distance of one movement in one direction was the burner-to-burner interval. The glass particles were deposited by repeating the operation that the turn-back position was shifted by 20 mm every time, and when the turn-back position was moved by 200 mm, the turn-back position was shifted in a reverse direction, and then when the turn-back position was back to the initial position, the turn-back position was shifted in a reverse direction.

For each of the intermediate burners 2, a raw material gas of $SiCl_4$ at 3 liters/min, hydrogen gas at 50 to 100 liters/min (initially 50 liters/min, increased with the growth of soot body 3, and finally 100 liters/min), oxygen gas at 80 liters/min were supplied. For each of the end burners 1, a raw material including $SiCl_4$ at 3.3 liters/min was supplied and, hydrogen gas and oxygen gas were supplied so that the temperature of face of the soot body on which glass particles are deposited by the end burners may be equal to the temperature of face of the soot body on which glass particles are deposited by the other burners.

In this state, the soot body 3 was produced. In obtained soot body, the effective portion length was 700 mm, and the variation in the outer diameter of the effective portion was within ±5% and excellent.

Figure 4:
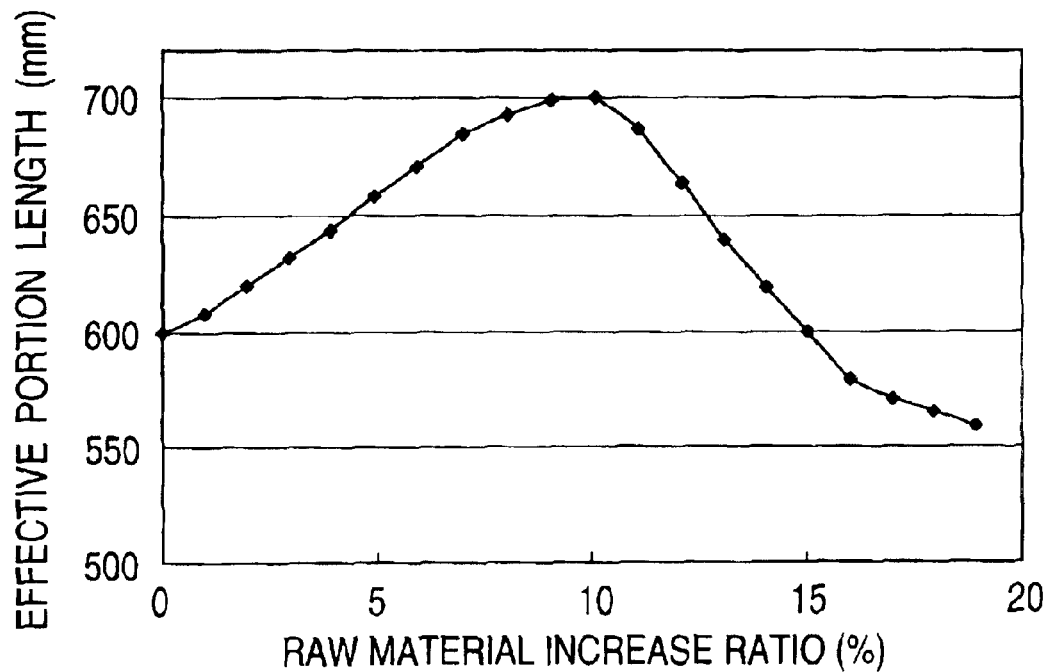
FIG. 4 is a diagram showing a relationship between the raw material increase ratio and the effective portion length in the example 1.
Figure 5:
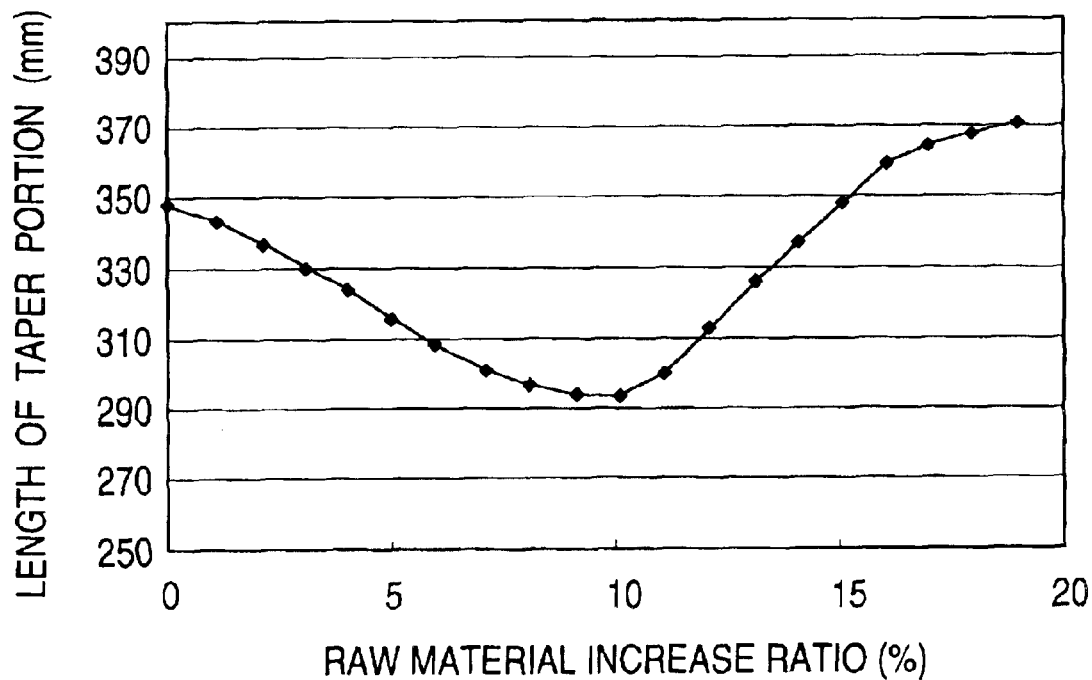
FIG. 5 is a diagram showing a relationship between the raw material increase ratio and the length of taper portion in the example 1.

Then, the flow rate of raw material to be supplied to the end burners was changed in the same manner, thereby investigating the effective portion length, the ineffective portion length (length of taper portion, length for one end portion). The results are shown in FIGS. 4 and 5.

Consequently, when the flow rate of raw material to the end burners was increased in the range within 15% (even if the flow rate of raw material was increased only slightly), there is the effect that the effective portion length became longer and the ineffective portion length became shorter.

Comparative Example 1

The soot body 3 was produced under the same conditions as in the example 1, except that the supply amounts of raw material, hydrogen and oxygen to the end burners 1 were the same as those to the intermediate burners 2. The effective portion length was 600 mm and the ineffective portion length was 350 mm. The ineffective portion length was 1.75 times the burner-to-burner interval.

Example 2

Figure 3A:
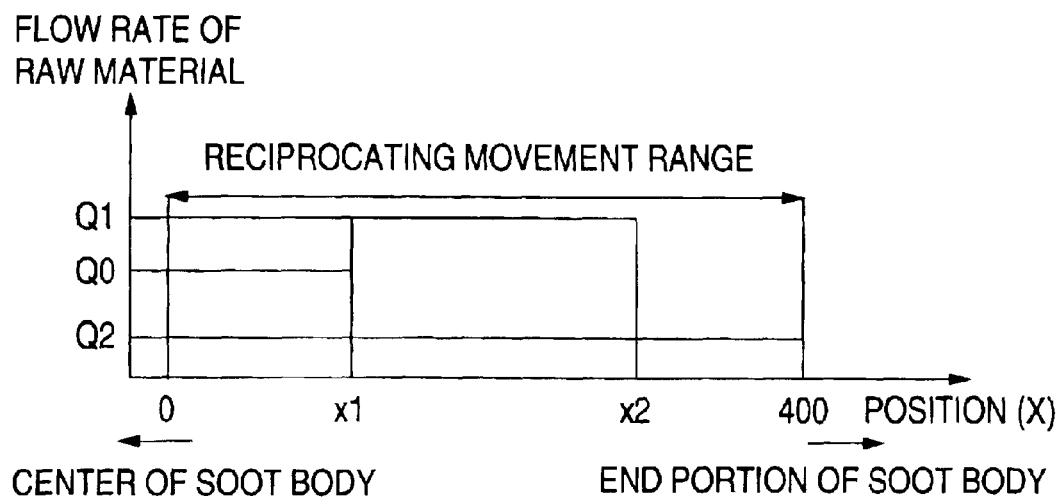
FIGS. 3A and 3B are an explanatory diagrams showing a change pattern of the supply amount of raw material to the end burner in the examples 2 to 4.
Figure 6:
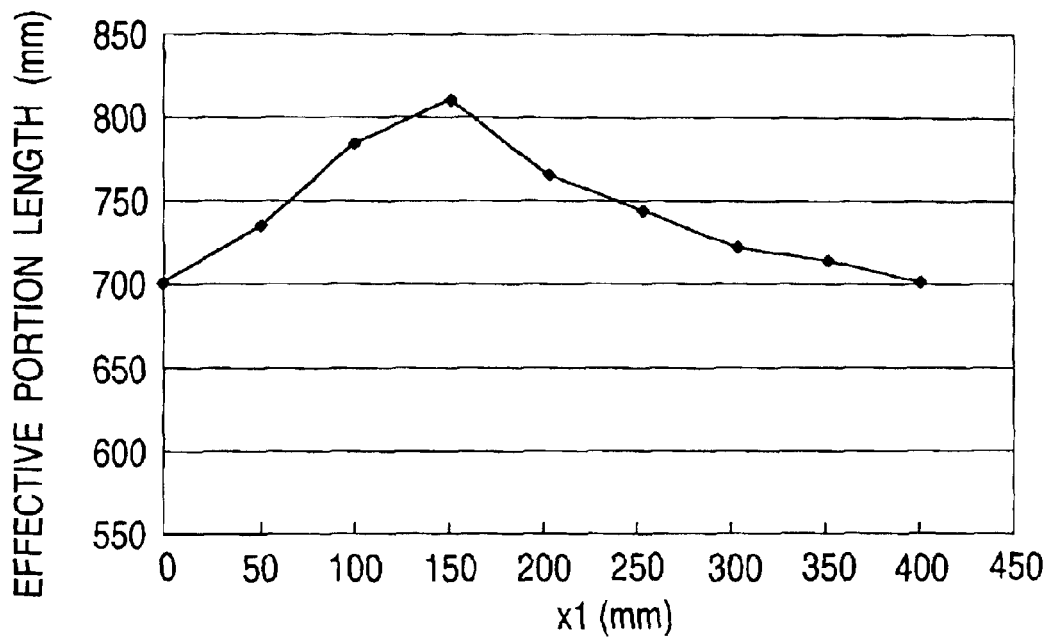
FIG. 6 is a diagram showing a relationship between x1 and the effective portion length in the example 2.
Figure 7:
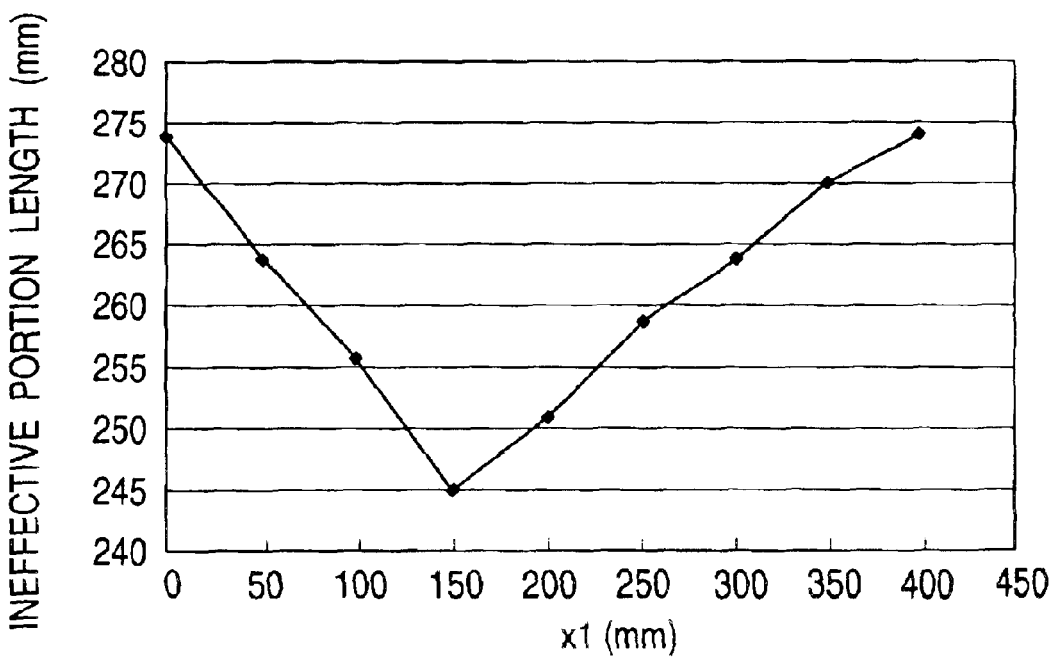
FIG. 7 is a diagram showing a relationship between x1 and the ineffective portion length in the example 2.

The soot body 3 was produced under the same conditions as in the example 1, except that the flow rate of the end burners 1 was changed in the pattern of FIG. 3A, wherein $Q0=3$ liters/min, $Q1=3.3$ liters/min, $Q2=0$ liters/min, $x2=400$ mm, and $x1$ was changed in a range from 0 to 400 mm (in the coordinates of FIG. 2). Then, the effective portion length and the ineffective portion length were investigated. The results are shown in FIGS. 6 and 7. The effective portion length was 700 mm or more under all the conditions, and it was found that the effective portion length could be increased. The ineffective portion length was 275 mm or less under all the conditions, and it was found that the yield of the effective portion for the soot body could be increased as a whole.

Example 3

Figure 8:
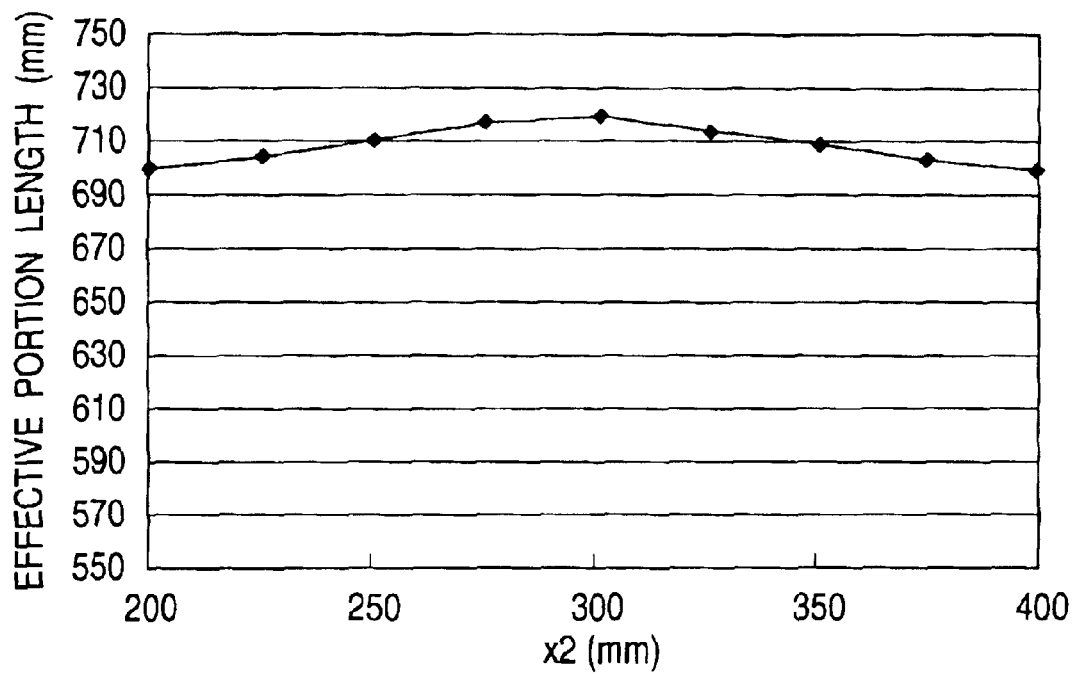
FIG. 8 is a diagram showing a relationship between x2 and the effective portion length in the example 3.
Figure 9:
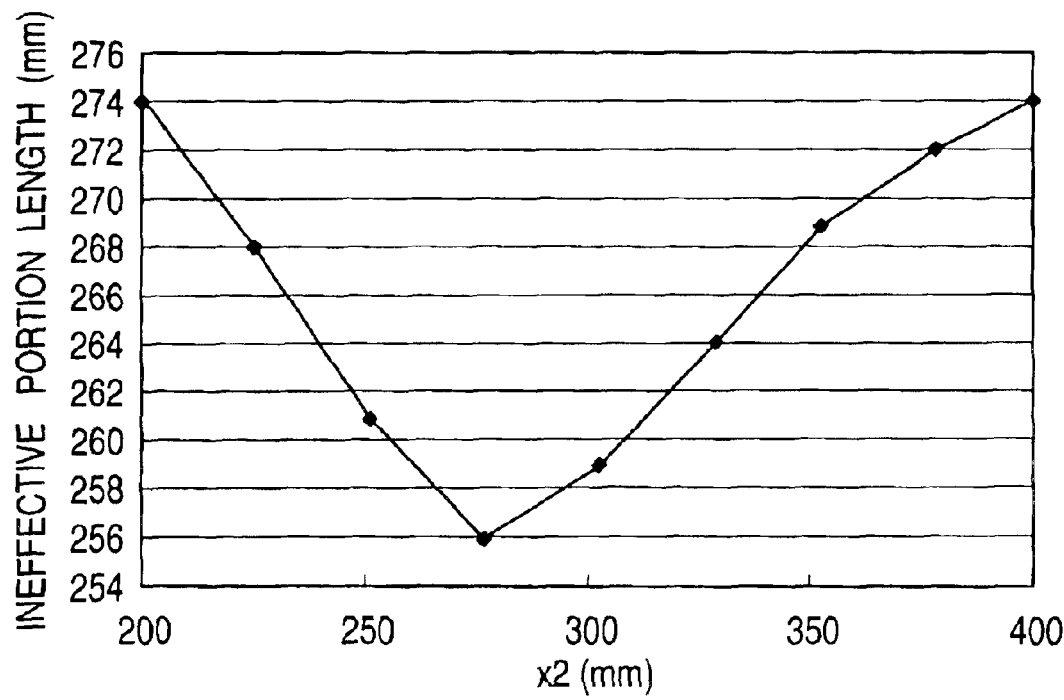
FIG. 9 is a diagram showing a relationship between x2 and the ineffective portion length in the example 3.

The soot body 3 was produced under the same conditions as in the example 1, except that the flow rate of the end burners 1 was changed in the pattern of FIG. 3A, wherein $Q0=3$ liters/min, $Q1=3.3$ liters/min, $Q2=0$ liters/min, $x1=200$ mm, and $x2$ was changed in a range from 0 to 400 mm (in the coordinates of FIG. 2). Then, the effective portion length and the ineffective portion length were investigated. The results are shown in FIGS. 8 and 9. The effective portion length was about 710 mm and almost unchanged. The ineffective portion length was 275 mm or less under all the conditions.

Example 4

Figure 3B:
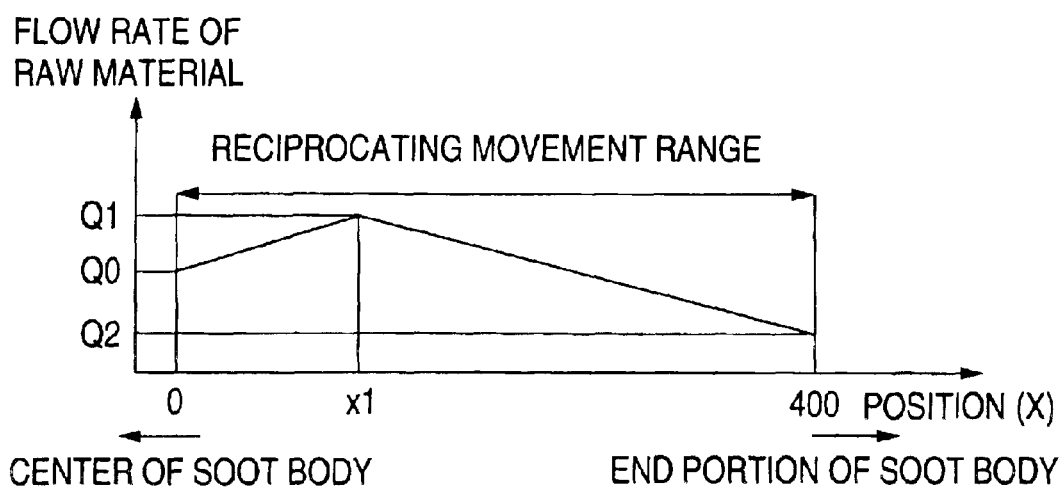
Figure 10:
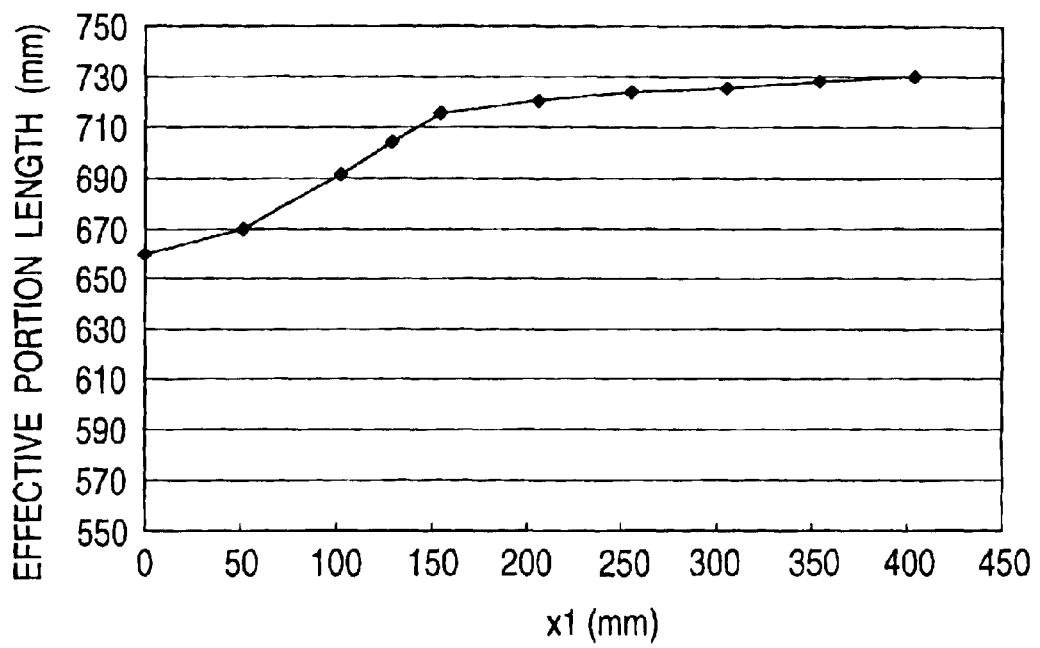
FIG. 10 is a diagram showing a relationship between x1 and the effective portion length in the example 4.
Figure 11:
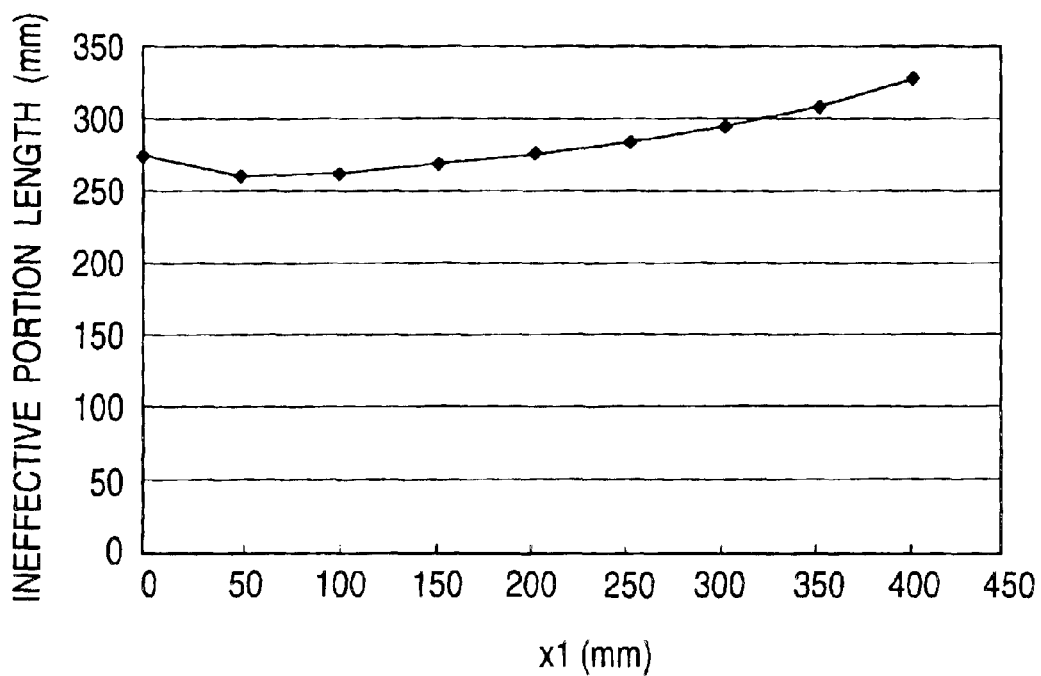
FIG. 11 is a diagram showing a relationship between x1 and the ineffective portion length in the example 4.

The soot body 3 was produced under the same conditions as in the example 1, except that the flow rate of the end burners 1 was changed in the pattern of FIG. 3B, wherein $Q0=3$ liters/min, $Q1=3.6$ liters/min, $Q2=0$ liters/min, and $x1$ was changed in a range from 0 to 400 mm (in the coordinates of FIG. 2). Then, the effective portion length and the ineffective portion length were investigated. The results are shown in FIGS. 10 and 11. Under all the conditions, the effective portion length was increased and excellent. The ineffective portion length was below 350 mm under all the conditions, and could be made below 1.75 times the burner interval. The ineffective portion of the soot body produced according to the invention was shorter than conventionally produced, and below 1.75 times the burner interval.

What is claimed is:

1. A method for producing a soot body comprising:
reciprocating a glass rod and at least two end burners and at least one intermediate burner which are arranged to be opposed to the glass rod, parallel and relatively by a distance burner-to-burner interval while performing an operation that a turn-back position of the reciprocating movement is shifted by a predetermined width in a predetermined direction at every turn-back, and if the turn-back position is moved substantially by a distance of the burner-to-burner interval, the turn-back position is shifted in a reverse direction to be back to an initial position of the reciprocating movement, depositing glass particles synthesized by the burners on a surface of the glass rod while rotating the glass rod, wherein glass particle synthesizing conditions of the end burners are changed to have a greater deposition amount of glass particles per unit time than the at least one intermediate burners in at least a part of a movement range of the end burners.

2. The method for producing the soot body according to claim 1, further comprising:
detecting relative positions between the end burners and the glass rod, wherein the glass particle synthesizing conditions for the end burners are changed in accordance with the detected relative positions.

3. The method for producing the soot body according to claim 1, wherein the glass particle synthesizing conditions of the end burners are changed by changing a supply amount of at least one of a raw material, a combustible gas, and a combustion support gas to the end burners.

4. The method for producing the soot body according to claim 3, wherein the glass particle synthesizing conditions of the end burners are changed by increasing the supply amount of raw material in a part of the movement range of the end burners.

5. The method for producing the soot body according to claim 4, wherein the glass particle synthesizing conditions of the end burners are changed by changing the supply amount of raw material to the end burners from more than one to 1.15 times the supply amount of raw material to at least one intermediate burner.

6. The method for producing the soot body according to claim 1, wherein in the movement range of the end burners, the supply amount of raw material to the end burners is greater in a part of the movement range of the burners and smaller in another part of the movement range of the burners than the supply amount to the at least one intermediate burner.

7. The method for producing the soot body according to claim 6, wherein the part of the movement range of the burners where the supply amount of raw material to the end burners is smaller is set in an ineffective portion of the soot body.

* * * * *